United States Patent
Irony et al.

(10) Patent No.: US 10,681,640 B2
(45) Date of Patent: *Jun. 9, 2020

(54) METHOD AND SYSTEM FOR SYNCHRONIZED LOW-ENERGY SCANS

(71) Applicant: Apple Inc., Cupertino, CA (US)

(72) Inventors: Ran Irony, Hod Hasaron (IL); Ran Katz, Givatayim (IL); Alon Paycher, Beit-Hanaya (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,503

(22) Filed: Oct. 15, 2018

(65) Prior Publication Data

US 2019/0082391 A1 Mar. 14, 2019

Related U.S. Application Data

(63) Continuation of application No. 15/444,043, filed on Feb. 27, 2017, now Pat. No. 10,104,615, which is a
(Continued)

(51) Int. Cl.
*H04W 52/02* (2009.01)
*H04W 76/10* (2018.01)
(Continued)

(52) U.S. Cl.
CPC ... *H04W 52/0229* (2013.01); *H04W 56/0015* (2013.01); *H04W 76/10* (2018.02);
(Continued)

(58) Field of Classification Search
CPC ......... H04W 52/0225; H04W 52/0229; H04W 52/0235; H04W 52/0261; H04W 52/0274;
(Continued)

(56) References Cited

U.S. PATENT DOCUMENTS

| | | |
|---|---|---|
| 7,558,289 B1 | 7/2009 | Bidichandani et al. |
| 8,971,306 B1 | 3/2015 | Loc et al. |

(Continued)

FOREIGN PATENT DOCUMENTS

| | | |
|---|---|---|
| CN | 1525705 A | 9/2004 |
| CN | 1698314 A | 11/2005 |

(Continued)

OTHER PUBLICATIONS

Japanese Search Report with English language translation directed to related Japanese Patent Application No. 2015-057177, dated Feb. 24, 2016; 26 pages.

(Continued)

*Primary Examiner* — Kevin D Mew
(74) *Attorney, Agent, or Firm* — Sterne, Kessler, Goldstein & Fox P.L.L.C.

(57) ABSTRACT

In order to reduce the power consumption after a transmitting electronic device in a wireless network has been detected, a receiving electronic device calculates transmit times of subsequent beacons from the transmitting electronic device based on a clock drift of the transmitting electronic device and the beacon period. Then, the receiving electronic device receives the subsequent beacon by opening scan windows that encompass the calculated transmit times. However, because the transmit times are more predictable after the transmitting electronic device has been detected (and the clock drift of the transmitting electronic device is known to the receiving electronic device), the receiving electronic device can reduce the width of the scan windows. In addition, the transmitting electronic device can further reduce the power consumption by increasing the beacon period.

20 Claims, 6 Drawing Sheets

Related U.S. Application Data continuation of application No. 14/222,264, filed on Mar. 21, 2014, now Pat. No. 9,585,097.

(51) Int. Cl.
*H04W 56/00* (2009.01)
*H04W 84/12* (2009.01)

(52) U.S. Cl.
CPC ............. *H04W 84/12* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/164* (2018.01)

(58) Field of Classification Search
CPC ........... H04W 52/028; H04W 56/0015; H04W 76/00; H04W 76/10; H04W 84/12
See application file for complete search history.

(56) References Cited

U.S. PATENT DOCUMENTS

| | | | |
|---|---|---|---|
| 9,585,097 B2 | 2/2017 | Irony et al. | |
| 9,648,485 B2 | 5/2017 | Abraham et al. | |
| 9,655,139 B2* | 5/2017 | Habetha | H04W 74/006 |
| 2003/0114204 A1 | 6/2003 | Allen et al. | |
| 2005/0085279 A1 | 4/2005 | Aoki | |
| 2005/0174953 A1 | 8/2005 | Ho | |
| 2005/0208966 A1* | 9/2005 | David | H04L 12/12 455/553.1 |
| 2005/0249173 A1 | 11/2005 | Salokannel et al. | |
| 2006/0089138 A1* | 4/2006 | Smith | H04W 52/0229 455/426.1 |
| 2006/0268800 A1 | 11/2006 | Sugaya et al. | |
| 2006/0270438 A1 | 11/2006 | Choi | |
| 2007/0201423 A1* | 8/2007 | Laroia | H04W 40/244 370/345 |
| 2007/0242634 A1 | 10/2007 | Calcev et al. | |
| 2008/0232270 A1* | 9/2008 | Fleming | H04L 12/12 370/254 |
| 2008/0240163 A1 | 10/2008 | Ibrahim et al. | |
| 2009/0053999 A1 | 2/2009 | Shoemake et al. | |
| 2010/0002679 A1 | 1/2010 | Zhang et al. | |
| 2010/0008277 A1 | 1/2010 | Kopikare et al. | |
| 2010/0093279 A1* | 4/2010 | Linsky | H03L 7/183 455/41.2 |
| 2010/0135256 A1 | 6/2010 | Lee et al. | |
| 2010/0202354 A1 | 8/2010 | Ho | |
| 2010/0260084 A1 | 10/2010 | Imamura et al. | |
| 2011/0021142 A1* | 1/2011 | Desai | H04W 8/005 455/41.2 |
| 2011/0065394 A1 | 3/2011 | Cordeiro | |
| 2011/0150107 A1* | 6/2011 | Jung | H04W 52/0216 375/259 |
| 2011/0268097 A1 | 11/2011 | Agrawala et al. | |
| 2011/0292864 A1 | 12/2011 | Sasao et al. | |
| 2012/0127902 A1 | 5/2012 | Muqattash | |
| 2013/0003715 A1* | 1/2013 | Xhafa | H04W 52/0229 370/349 |
| 2013/0034004 A1* | 2/2013 | Mannemala | H04W 52/0216 370/252 |
| 2013/0044658 A1 | 2/2013 | Zhu et al. | |
| 2013/0083698 A1 | 4/2013 | Abhishek et al. | |
| 2013/0170420 A1 | 7/2013 | Kobayashi | |
| 2013/0183906 A1 | 7/2013 | Tavildar et al. | |
| 2013/0329658 A1 | 12/2013 | Liu | |
| 2013/0343198 A1 | 12/2013 | Chhabra et al. | |
| 2013/0343305 A1 | 12/2013 | Kwon et al. | |
| 2014/0028632 A1 | 1/2014 | Thielemann et al. | |
| 2014/0086125 A1* | 3/2014 | Polo | H04W 52/0229 370/311 |
| 2014/0206346 A1* | 7/2014 | Kiukkonen | H04W 52/0229 455/426.1 |
| 2014/0293978 A1 | 10/2014 | Yang et al. | |
| 2014/0293992 A1 | 10/2014 | Abraham et al. | |
| 2015/0029922 A1 | 1/2015 | Zheng et al. | |
| 2015/0055638 A1 | 2/2015 | Sugaya | |
| 2015/0201389 A1 | 7/2015 | Linsky et al. | |
| 2015/0271754 A1 | 9/2015 | Irony et al. | |
| 2015/0351008 A1 | 12/2015 | Mayor | |
| 2015/0382304 A1* | 12/2015 | Park | H04W 52/0248 455/41.2 |
| 2016/0037443 A1* | 2/2016 | Kim | H04W 48/16 455/438 |
| 2016/0094946 A1 | 3/2016 | Keithley | |
| 2016/0095061 A1 | 3/2016 | Vainapel et al. | |
| 2017/0171819 A1 | 6/2017 | Irony et al. | |
| 2017/0223604 A1 | 8/2017 | Skillermark et al. | |

FOREIGN PATENT DOCUMENTS

| | | |
|---|---|---|
| CN | 101444130 A | 5/2009 |
| CN | 101449619 A | 6/2009 |
| JP | 2003-101439 A | 4/2003 |
| JP | 2005-260987 A | 9/2005 |
| JP | 2008-048027 A | 2/2008 |
| JP | 2013-521692 A | 6/2013 |
| WO | WO 2007/139863 A2 | 12/2007 |
| WO | WO 2011/108870 A2 | 9/2011 |

OTHER PUBLICATIONS

Office Action with English language translation directed to related Japanese Patent Application No. JP 2015-057177, dated Mar. 16, 2016; 9 pages.

* cited by examiner

METHOD AND SYSTEM FOR SYNCHRONIZED LOW-ENERGY SCANS

CROSS-REFERENCE TO RELATED APPLICATION

This application is a continuation of U.S. application Ser. No. 15/444,043, filed on Feb. 27, 2017, entitled, Synchronized Low-Energy Detection Technique, which is a continuation of U.S. patent application Ser. No. 14/222,264, filed on Mar. 21, 2014, entitled Synchronized Low Energy Detection Technique, all of which are incorporated herein by reference in their entireties.

BACKGROUND

Field

The described embodiments relate to techniques for reducing power consumption by synchronizing the detection of electronic devices in a wireless network.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface.

In many wireless-communication protocols, electronic devices detect each other by regularly broadcasting beacons and scanning for the beacons from other electronic devices. For example, an electronic device that communicates with another electronic device in a wireless network using a communication protocol that is compatible with an IEEE 802.11 standard (which is sometimes referred to as 'Wi-Fi') may wake up its radio periodically to receive a beacon frame at beacon transmission times.

However, regularly transmitting and receiving these beacons typically results in significant power consumption by the networking subsystems. Therefore, the existing detection techniques in wireless networks may reduce the operating time of the electronic device, which can degrade the user experience.

SUMMARY

The described embodiments include a receiving electronic device. This receiving electronic device includes: an antenna; and an interface circuit, coupled to the antenna, that communicates with a transmitting electronic device in a wireless network. The interface circuit detects the transmitting electronic device by receiving, during a scan window, a beacon in a set of beacons having an initial beacon period, where the interface circuit uses scan windows having an initial window width and an initial window period. Then, the interface circuit calculates transmit times of subsequent beacons from the transmitting electronic device based on clock drift of the transmitting electronic device and/or initial beacon period. Next, the interface circuit receives the subsequent beacons from the transmitting electronic device during subsequent scan windows that encompass the calculated transmit times of the subsequent beacons, where the subsequent scan windows have widths that are less than the initial width.

In some embodiments, after detecting the transmitting electronic device, the interface circuit provides a revised beacon period to the transmitting electronic device, where the revised beacon period is greater than the initial beacon period, and the calculated transmit times of the subsequent beacons are further calculated based on the revised beacon period.

Moreover, for subsequent times greater than a synchronization time between the transmitting electronic device and the receiving electronic device, the interface circuit may receive the subsequent beacons from the transmitting electronic device by opening scan windows having the initial width at the initial window period. Thus, after the synchronization time, the receiving electronic device may revert to an initial detection technique.

Furthermore, for the subsequent times, the subsequent scan windows may increase in size as a function of time, and the increase in size may be proportionate to the clock drift.

The receiving electronic device may obtain or determine the clock drift of the transmitting electronic device in a variety of ways. In particular, after detecting the transmitting electronic device, the interface circuit may: receive information from the transmitting electronic device that specifies the initial beacon period and the clock drift; receive transmitted beacons and determine the initial beacon period and the clock drift based on the transmitted beacons; access, via a network, information specifying the initial beacon period and the clock drift; and access information, stored in the receiving electronic device, specifying the initial beacon period and the clock drift.

In some embodiments, the interface circuit: receives a network clock via a network, where the calculated transmit times are also based on the network clock. Then, the interface circuit compares the transmit times of the subsequent beacons with the network clock. When a difference between the transmit times and the calculated transmit times exceeds a threshold value, the interface circuit provides a synchronization correction to the transmitting electronic device.

Note that in some embodiments at least some of the preceding operations performed by the interface circuit are performed by a processor executing a program module that includes instructions for at least some of the preceding operations.

Another embodiment provides a computer-program product for use with the receiving electronic device. This computer-program product includes instructions for at least some of the operations performed by the receiving electronic device.

Another embodiment provides a method for communicating between the transmitting electronic device and the receiving electronic device. This method includes at least some of the operations performed by the receiving electronic device.

Another embodiment provides the transmitting electronic device. The transmitting electronic device includes: an antenna; and an interface circuit, coupled to the antenna, that communicates with the receiving electronic device in the wireless network. Moreover, the interface circuit transmits beacons based on the initial beacon period. Then, the interface circuit receives the revised beacon period from the receiving electronic device, where the revised beacon period is greater than the initial beacon period. Next, the interface circuit transmits beacons based on the revised beacon period.

Note that the transmitting electronic device may include a clock circuit having a clock drift, and the beacons may be transmitted at transmit times based on a clock output by the clock circuit. Moreover, the interface circuit may receive the network clock via the network, where the clock circuit outputs the clock based on the network clock. Then, the interface circuit may receive, from the receiving electronic device, the synchronization correction. Next, the interface circuit may adjust the clock circuit based on the synchronization correction so that a difference between the network clock and a multiple of the clock is less than a threshold value.

In some embodiments, while transmitting the beacons, the interface circuit provides information to the receiving electronic device that specifies the initial beacon period and the clock drift.

Another embodiment provides a computer-program product for use with the transmitting electronic device. This computer-program product includes instructions for at least some of the operations performed by the transmitting electronic device.

Another embodiment provides a method for communicating between the transmitting electronic device and the receiving electronic device. This method includes at least some of the operations performed by the transmitting electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to reduce the power consumption after a transmitting electronic device (such as a sensor) in a wireless network has been detected, a receiving electronic device (such as a smartphone) calculates transmit times of subsequent beacons from the transmitting electronic device based on a clock drift of the transmitting electronic device and the beacon period. Then, the receiving electronic device receives the subsequent beacon by opening scan windows that encompass the calculated transmit times. However, because the transmit times are more predictable after the transmitting electronic device has been detected (and the clock drift of the transmitting electronic device is known to the receiving electronic device), the receiving electronic device can reduce the width of the scan windows. In addition, the transmitting electronic device can further reduce the power consumption by increasing the beacon period. The receiving electronic device may also monitor synchronization with the transmitting electronic device based on actual beacon transmit times, and may provide a synchronization correction to the transmitting electronic device to maintain the synchronization, thereby allowing continued use of the smaller scan windows and/or the increased beacon period.

For example, the beacons, information specifying the clock drift, and the synchronization correction may be conveyed in packets that are transmitted and received by radios in the receiving electronic devices in accordance with a communication protocol, such as an Institute of Electrical and Electronics Engineers (IEEE) 802.11 standard, Bluetooth™ (from the Bluetooth Special Interests Group of Kirkland, Wash.), and/or another type of wireless interface. In the discussion that follows, Bluetooth™ is used as an illustrative example.

Figure 1:
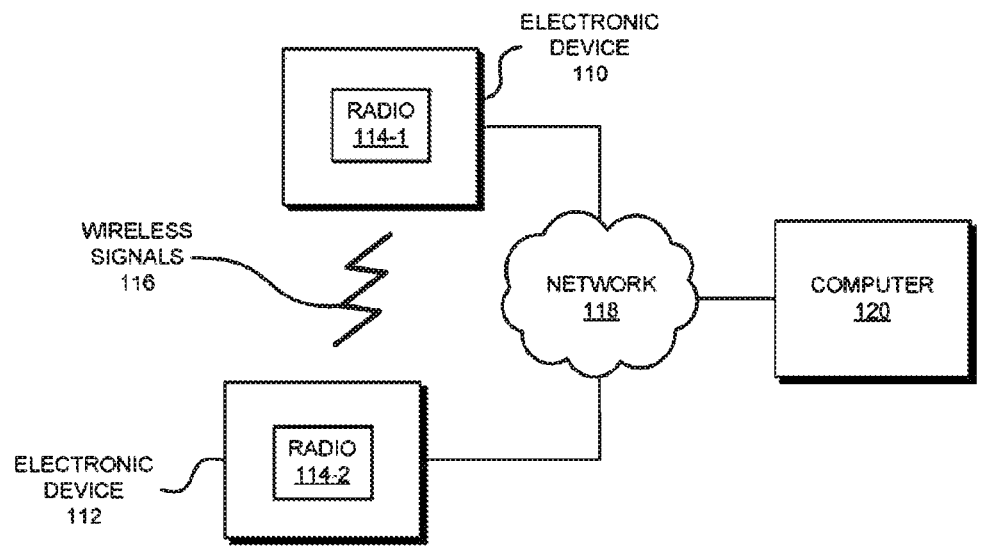
FIG. 1 is a block diagram illustrating electronic devices wirelessly communicating in accordance with an embodiment of the present disclosure.

The communication between the electronic devices is shown in FIG. 1, which presents a block diagram illustrating electronic devices 110 and 112 wirelessly communicating. In particular, these electronic devices may wirelessly communicate while: detecting one another by scanning wireless channels, transmitting and receiving beacons or beacon frames on wireless channels, establishing connections (for example, by transmitting connect requests), and/or transmitting and receiving packets (which may include the request and/or additional information as payloads).

Figure 8:
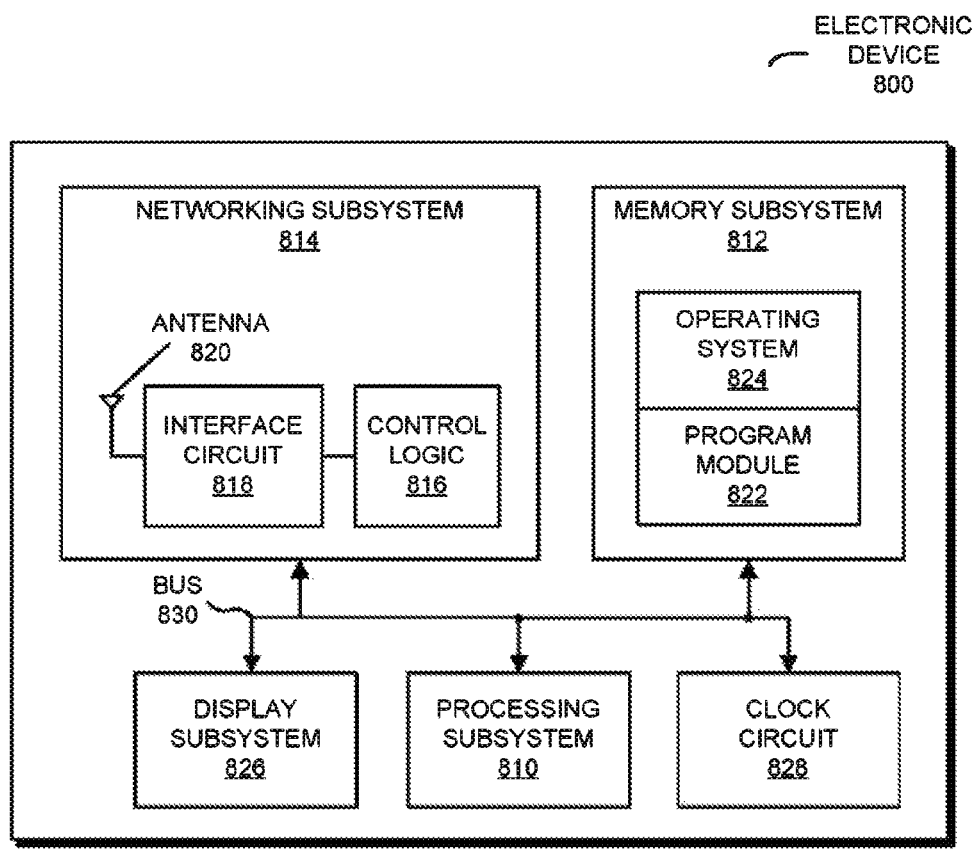
FIG. 8 is a block diagram illustrating one of the electronic devices of FIG. 1 in accordance with an embodiment of the present disclosure.

As described further below with reference to FIG. 8, electronic devices 110 and 112 may include subsystems, such as a networking subsystem, a memory subsystem and a processor subsystem. In addition, electronic devices 110 and 112 may include radios 114 in the networking subsystems. More generally, electronic devices 110 and 112 can include (or can be included within) any electronic devices with the networking subsystems that enable electronic devices 110 and 112 to wirelessly communicate with another electronic device. This can comprise transmitting beacons on wireless channels to enable electronic devices to make initial contact with or detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are transmitted from a radio 114-1 in electronic device 110. These wireless signals 116 are received by radio 114-2 in electronic device 112. In particular, electronic device 110 (such as a sensor, e.g., a heart-rate monitor or a computer mouse) may broadcast or transmit beacons at transmit times. In turn, electronic device 112 (such as a smartphone) may receive one or more beacons, thereby detecting the presence of electronic device 110, by opening scan windows during the transmit times. This may allow electronic devices 110 and 112 to optionally establish a connection and communicate with each other.

However, because electronic devices 110 and 112 are not synchronized, electronic device 110 may need to transit beacons more often and/or electronic device 112 may need to use a wide scan-window width in order to ensure that the beacons are received. In turn, this may require the networking subsystems (such as interface circuits) in electronic devices 110 and 112 to be in active or a high power-consumption mode more often and/or for a longer duration, which may increase the power consumption and decrease the operating time of electronic devices 110 and 112.

In the detection technique described below, electronic device 112 may receive or determine a clock drift of electronic device 110 after or while electronic device 110 is discovered. For example, electronic device 112 may receive, via wireless communication, information specifying the clock drift from electronic device 110. Alternatively or additionally, electronic device 112 may determine the clock drift by measuring the transmit times, accessing, via network 118, the information stored in computer 120 and/or accessing information, stored in electronic device 112, specifying the clock drift (e.g., the information may have been pre-loaded into electronic device 112).

Using the clock drift of electronic device 110, electronic device 112 may calculate the subsequent transmit times of beacons from electronic device 110. This may allow electronic device 112 to use smaller scan-window widths. In addition, electronic device 112 may provide instructions to electronic device 110 to increase the time interval between beacon transmit times (which is sometimes referred to as the 'beacon period'). In this way, the detection technique may allow the networking subsystems in electronic devices 110 and/or 112 to spend less time in the high power-consumption mode, thereby reducing the power consumption and increasing the operating time between battery charging of electronic devices 110 and/or 112.

Over time, the uncertainty in the transmit times will grow. Eventually, after a synchronization time, the uncertainty is large enough that electronic device 112 would have to revert to the initial scan-window width and/or electronic device 110 would have to revert to the initial beacon period. For example, electronic devices 110 and 112 may connect and communicate briefly. If there is no communication between electronic devices 110 and 112 for a time interval and then electronic devices 110 and 112 attempt to communicate again, electronic device 112 may 'remember' electronic device 110 and may use the reduced scan-window width so long as this subsequent communication occurs for times less than the synchronization time after the initial connection between electronic devices 110 and 112 or the initial detection of electronic device 110. Otherwise, electronic devices 110 and 112 may use the initial beacon period and/or the reduced scan-window width.

In an alternative approach, electronic device 112 may monitor the transmit times of the subsequent beacons from electronic device 110 and may provide a synchronization correction to electronic device 110 so that the synchronization between electronic devices 110 and 112 is maintained (i.e., the uncertainty in the transmit times may remain bounded). This re-synchronization approach may be facilitated by a network clock, such as one provided by: computer 120, a cellular-telephone network and/or a global positioning system such as GPS (thus the network clock may be a GPS clock). In particular, electronic device 112 can use its own clock and/or the network clock to assess the drift in the transmit times and can provide, via wireless communication, the synchronization correction (as needed) to electronic device 110 to maintain the synchronization between electronic devices 110 and 112. This may allow the continued use of the smaller scan-window width and/or the increased beacon period and, thus, the continued reduction in the power consumption of electronic devices 110 and/or 112.

Note that in some embodiments the synchronization occurs between electronic devices 110 and 112 after or while electronic device 110 is detected without a connection being established between electronic devices 110 and 112. Thus, in the context of Bluetooth™, there may not be bidirectional packet exchange between electronic devices 110 and 112 in the detection technique.

In the described embodiments, processing a packet or frame in either of electronic devices 110 and 112 includes: receiving wireless signals 116 with the packet or frame; decoding/extracting the packet or frame from received wireless signals 116 to acquire the packet or frame; and processing the packet or frame to determine information contained in the packet or frame (such as the request or the additional information in the payload, e.g., information specifying clock drift of electronic device 110 and/or a synchronization correction).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
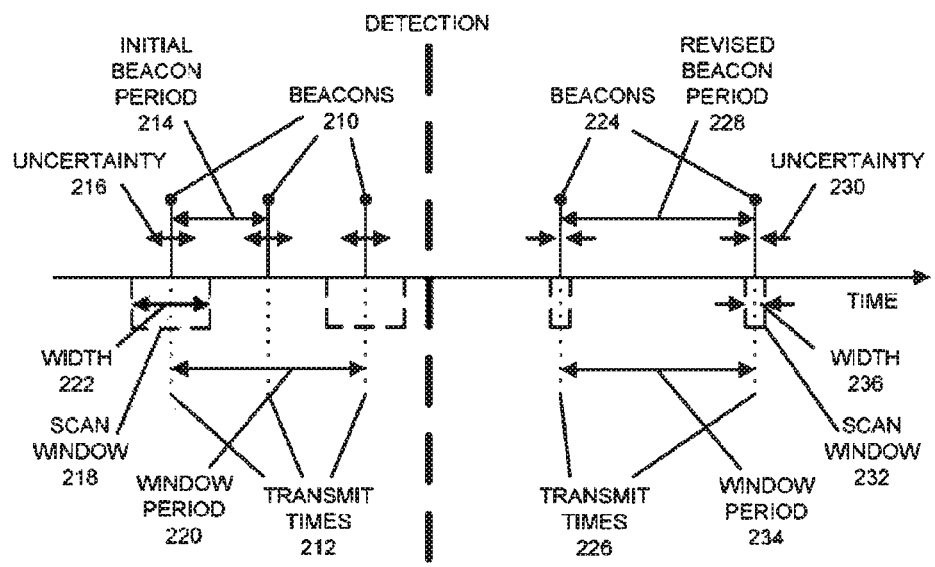
FIG. 2 is a timing diagram illustrating communication between the electronic devices of FIG. 1 in accordance with an embodiment of the present disclosure.

FIG. 2 presents a timing diagram illustrating communication between electronic devices 110 and 112 in FIG. 1. During the communication, electronic device 110 transmits beacons 210 at transmit times 212 that are separated by a nominal or target initial beacon period 214. Because of clock drift in electronic device 110, transmit times 212 have uncertainty 216. Consequently, electronic device 112 may open scan windows (such as scan window 218) having initial width 222 at initial window period 220 in order to receive one or more of beacons 210 and, thus, to detect electronic device 110. In particular, window period 220 may be short and width 222 may be wide.

After electronic device 110 has been detected, electronic device 112 may optionally establish a connection or pairing with electronic device 110. (However, as noted previously, in some embodiments a connection is not established.) Then, electronic device 112 may receive, access or determine the clock drift and/or beacon period 214. For example, electronic device 112 may: receive information specifying the clock drift and/or beacon period 214 from electronic device 110; determine the clock drift and/or beacon period 214 from transmit times 212; access stored information specifying the clock drift and/or beacon period 214 in computer 120 (FIG. 1) based on an identifier of electronic device 110 (such as a media access control address or MAC address of electronic device 110, or a model type of electronic device 110); and/or access information, stored in electronic device 112, specifying the initial beacon period and the clock drift based on the identifier of electronic device 110. Using this information, electronic device 112 may calculate transmit times 226 for subsequent beacons 224. These beacons may be received by electronic device 112 by opening subsequent scan windows (such as scan window 232) having revised width(s) (such as width 236) at revised window period 234. The revised window period 234 may be less than initial window period 220, and revised width 236 may be less than width 222. As noted previously, this may significantly reduce the power consumption of electronic device 112.

Furthermore, after electronic device 110 is detected, electronic device 112 may provide a revised beacon period 228 to electronic device 110. This revised beacon period may be greater than initial beacon period 214, which may significantly reduce the power consumption of electronic device 110. In these embodiments, electronic device 112 may also calculate transmit times 226 for subsequent beacons 224 based on revised beacon period 228.

Because of the clock drift in electronic device 110, there is a growing uncertainty 230 in transmit times 226. In particular, the uncertainty in transmit times 226 may increase as a function of time. For example, for a clock drift of 2 ppm, two hours after electronic device 110 is detected the cumulative uncertainty may be 28 ms. Electronic device 112 may address this increasing uncertainty by proportionately increasing the width of the subsequent scan windows as a function of time.

Figure 3:
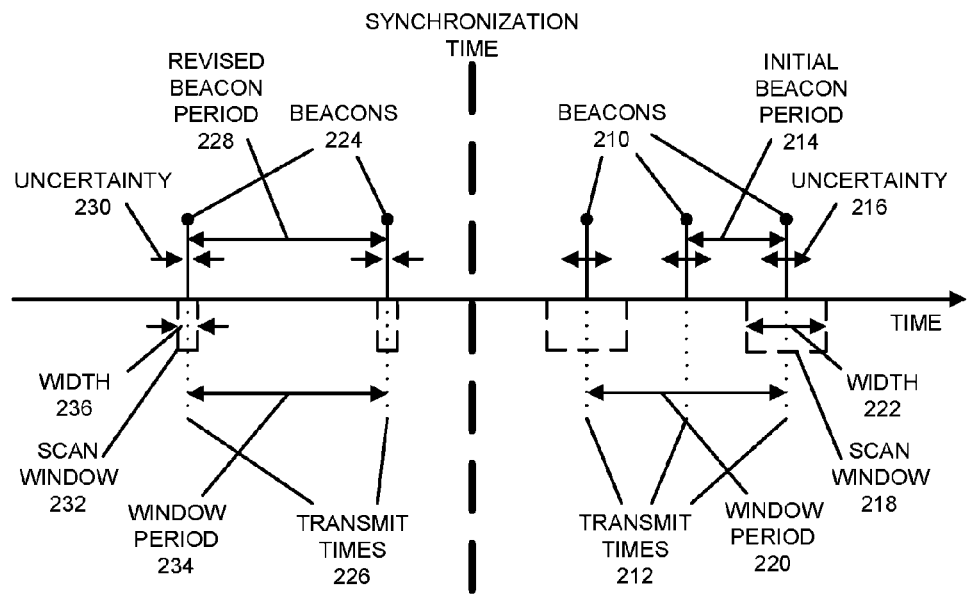
FIG. 3 is a timing diagram illustrating communication between the electronic devices of FIG. 1 in accordance with an embodiment of the present disclosure.

Eventually, for times greater than a synchronization time between electronic devices 110 and 112, electronic device 112 may need to revert to the initial detection technique. This is shown in FIG. 3, which presents a timing diagram illustrating communication between electronic devices 110 and 112 in FIG. 1. In particular, after the synchronization time (which may be hours or days after electronic device 110 is first detected), electronic device 112 may open the scan windows having initial width 222 at initial window period 220. Similarly, electronic device 110 may revert to initial beacon period 214 when transmitting beacons.

In some embodiments, electronic devices 110 and/or 112 receive a high-precision network clock, e.g., via a network (such as network 118 in FIG. 1). (In some embodiments, the network clock is provided during normal operation of the network and, thus, is not a special signal.) Electronic device 112 may calculate transmit times 226 based on the network clock. Furthermore, electronic device 112 may compare the actual transmit times 226 with a time determined based on the network clock (such as an M/N multiple of the network clock, where M and N are integers). When a difference between the actual transmit times and the calculated transmit times exceeds a threshold value, electronic device 112 may provide a synchronization correction to electronic device 110. In this way, the uncertainty in the transmit times may be bounded by maintaining the synchronization between electronic devices 110 and 112, which may allow the power savings to be continued. In these embodiments, the widths of the subsequent scan windows may be held constant (as opposed to increasing as a function of time).

Figure 4:
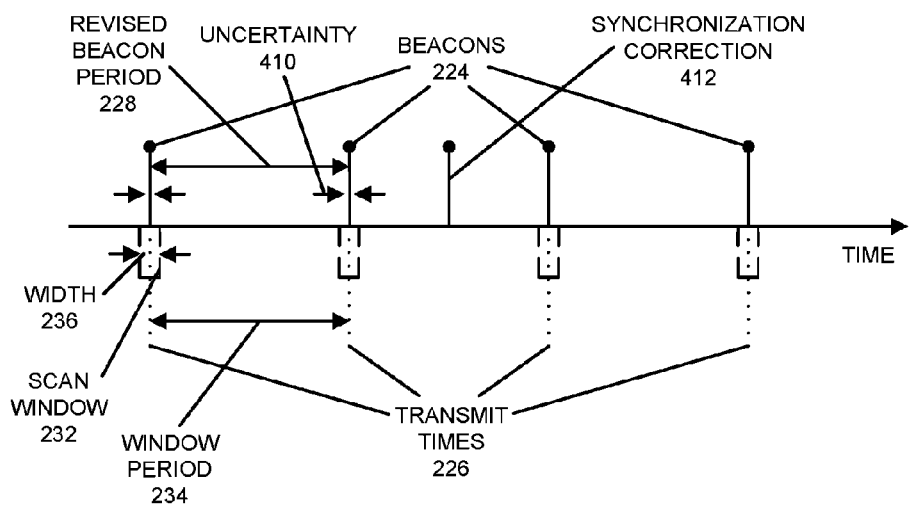
FIG. 4 is a timing diagram illustrating communication between the electronic devices of FIG. 1 in accordance with an embodiment of the present disclosure.

This approach (which is sometimes referred to as 'calibrated detection') is shown in FIG. 4, which presents a timing diagram illustrating communication between electronic devices 110 and 112 in FIG. 1. In particular, when uncertainty 410 in one of transmit times 226 exceeds a threshold value (such as a fraction of width 236), electronic device 112 may provide synchronization correction 412 to electronic device 110, thereby allowing electronic device 110 to adjust subsequent transmit times and to reset or eliminate the uncertainty (at least for a time).

For example, electronic device 110 may include a clock circuit (such as clock circuit 828 in FIG. 8) having the clock drift, and beacons 224 may be transmitted at transmit times 226 based on a clock output by the clock circuit. If electronic device 110 receives the network clock, then the clock circuit may also output the clock based on the network clock.

When electronic device 110 receives synchronization correction 412, electronic device 110 may adjust the clock circuit based on synchronization correction 412 so that a difference between the network clock and a multiple of the clock (such as MIN times the clock) is less than a threshold value. In this way, uncertainty 410 in transmit times 226 may be bounded, thereby allowing the continued use of window period 234, width 236, and/or revised beacon period 228.

Note that the synchronization correction may be shared with multiple electronic devices (such as other 'scanners'), so that these other electronic devices can use the detection technique (including the reduced scan-window width and/or increased window period) the first time they interact with electronic device 110. In addition, the use of a global or network clock may allow a replay-resistant encryption technique to be used during the communication between electronic devices 110 and 112.

While the preceding examples illustrated the use of a fixed initial beacon period 214 and a fixed initial window period 220 (FIGS. 2 and 3), in some embodiments the initial beacon period and the initial window period may be selected randomly (thus, the initial values may be mean values). For example, during a beaconing mode, Bluetooth™ may use a random beacon and scan-window technique where electronic device 110 (FIG. 1) sends beacons and electronic device 112 (FIG. 1) scans for the beacons. Because these activities are not synchronized, the likelihood that the scanner (electronic device 112) will meet the advertiser (electronic device 110) is low. This statistical approach may require the use of either a very wide scan-window width (with a commensurate negative impact on the power consumption) or a very long detection time (up to tens of seconds). In contrast, after detection and optionally establishing the connection, the disclosed detection technique allows electronic devices 110 and 112 to exchange a shared clock that allows them to synchronize subsequent advertising and scanning to reduce the power consumption and the detection time (which is now deterministic).

In an exemplary embodiment, the initial beacon period may be 181 ms, the initial window period may be 900 ms and the initial scan-window width may be 30 ms. These values may result in an average detection time of 3.5 s and a power consumption of 500 mW. After electronic device 110 is detected and electronic devices 110 and 112 (FIG. 1) are synchronized, the revised beacon period may be 1.8 s, the revised window period may be 1.8 s and the revised scan-window width may be 100 μs. The revised values may result in an average detection time of 1.8 s (more generally, the detection time may be selected to be 0.5-2 s) and a power consumption of 300 mW.

Figure 5:
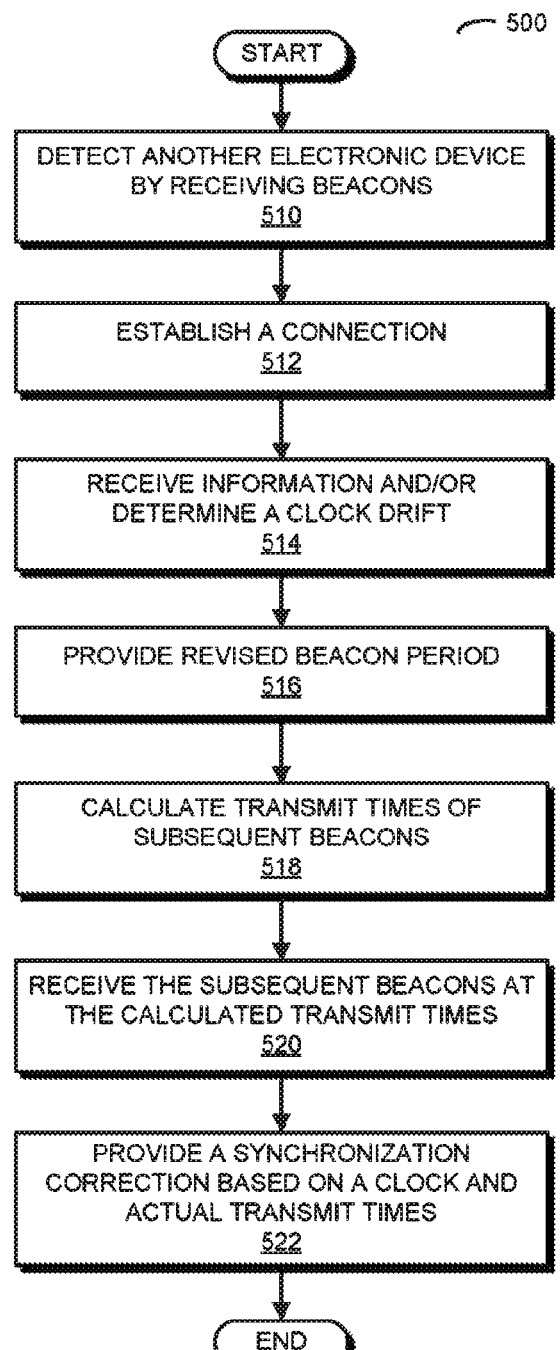
FIG. 5 is a flow diagram illustrating a method for communicating between the electronic devices in FIG. 1 in accordance with an embodiment of the present disclosure.

FIG. 5 presents a flow diagram illustrating method 500 for communicating between the electronic devices in FIG. 1, such as electronic device 112 communicating with electronic device 110. During operation, the electronic device detects another electronic device by receiving beacons (operation 510) that are broadcast or transmitted at an initial beacon period. For example, the electronic device may open scan windows having an initial width at an initial window period. Then, the electronic device optionally establishes a connection (operation 512) with the other electronic device. Moreover, the electronic device receives information specifying a clock drift of the other electronic device or determines the clock drift (operation 514). The electronic device may also optionally provide a revised beacon period (operation 516) to the other electronic device. This revised beacon period may be greater than the initial beacon period.

Next, the electronic device may calculate transmit times of subsequent beacons (operation 518) from the other electronic device. Furthermore, the electronic device may receive the subsequent beacons at the calculated transmit times (operation 520) from the other electronic device. For example, the electronic device may open scan windows having a revised width at a revised window period. Note that the revised width may be less than the initial width, and the revised window period may be greater than the initial window period.

In some embodiments, the communication between the electronic devices is calibrated. In particular, the electronic device may provide a synchronization correction to the other electronic device based on a clock (such as a network clock or a clock in the electronic device) and the actual transmit times (operation 522). The synchronization correction may allow the other electronic device to bound an uncertainty in the transmit times, which is associated with the clock drift.

Figure 6:
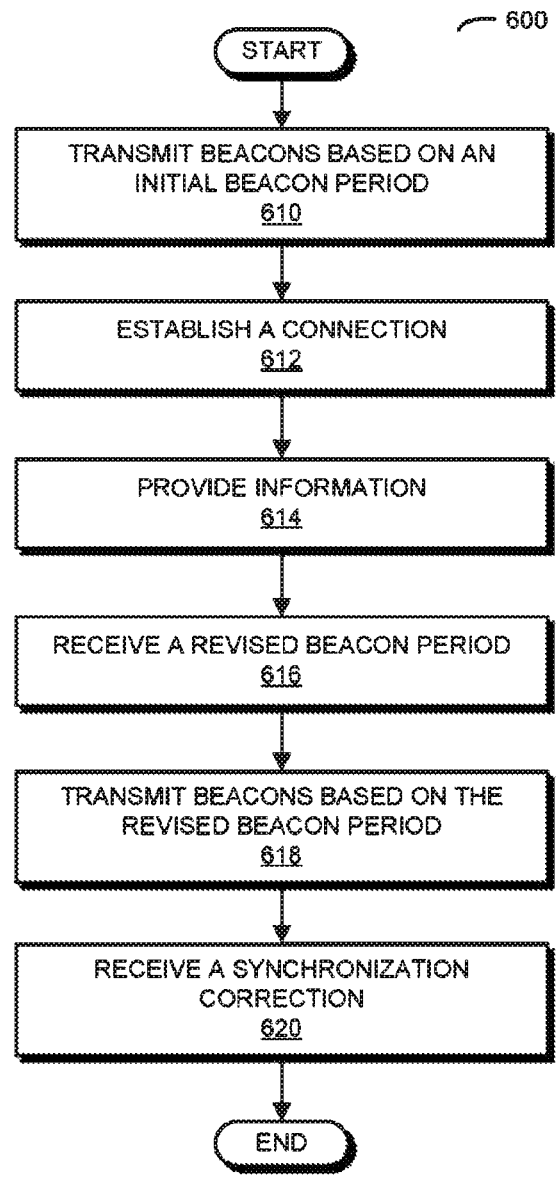
FIG. 6 is a flow diagram illustrating a method for communicating between the electronic devices of FIG. 1 in accordance with an embodiment of the present disclosure.

FIG. 6 presents a flow diagram illustrating a method for communicating between the electronic devices of FIG. 1, such as electronic device 110 communicating with electronic device 112. During operation, the other electronic device transmits beacons based on an initial beacon period (operation 610). Then, the other electronic device optionally establishes the connection (operation 612) with the electronic device. Moreover, the other electronic device may optionally provide information (operation 614) specifying the clock drift of the other electronic device and/or the initial beacon period. Note that the other electronic device may optionally receive information specifying a revised beacon period (operation 616) from the electronic device.

Subsequently, the other electronic device transmits subsequent beacons at transmit times that are based on the revised beacon period (operation 618).

In embodiments where the communication between the electronic devices is calibrated, the other electronic device may receive the synchronization correction from the electronic device (operation 620). The synchronization correction may allow the other electronic device to bound an uncertainty in the transmit times, which is associated with the clock drift.

In these ways, the electronic devices (for example, interface circuits and/or drivers in the electronic devices) may facilitate communication between the electronic devices with reduced power consumption and reduced detection times. In particular, advertising or broadcast and detection may be deterministic (instead of statistical), which may allow interface circuits in the electronic devices to spend less time in a high power-consumption mode. In addition, because the beacons communicated among the electronic devices in the wireless network can be at known or deterministic times, competition for scarce network resources can be avoided. This may reduce the probability of contention, which may allow the amount of time the electronic devices spend in the active (high power-consumption) mode to be reduced.

In some embodiments of methods 500 (FIG. 5) and 600, there may be additional or fewer operations. Moreover, the order of the operations may be changed, and/or two or more operations may be combined into a single operation.

Figure 7:
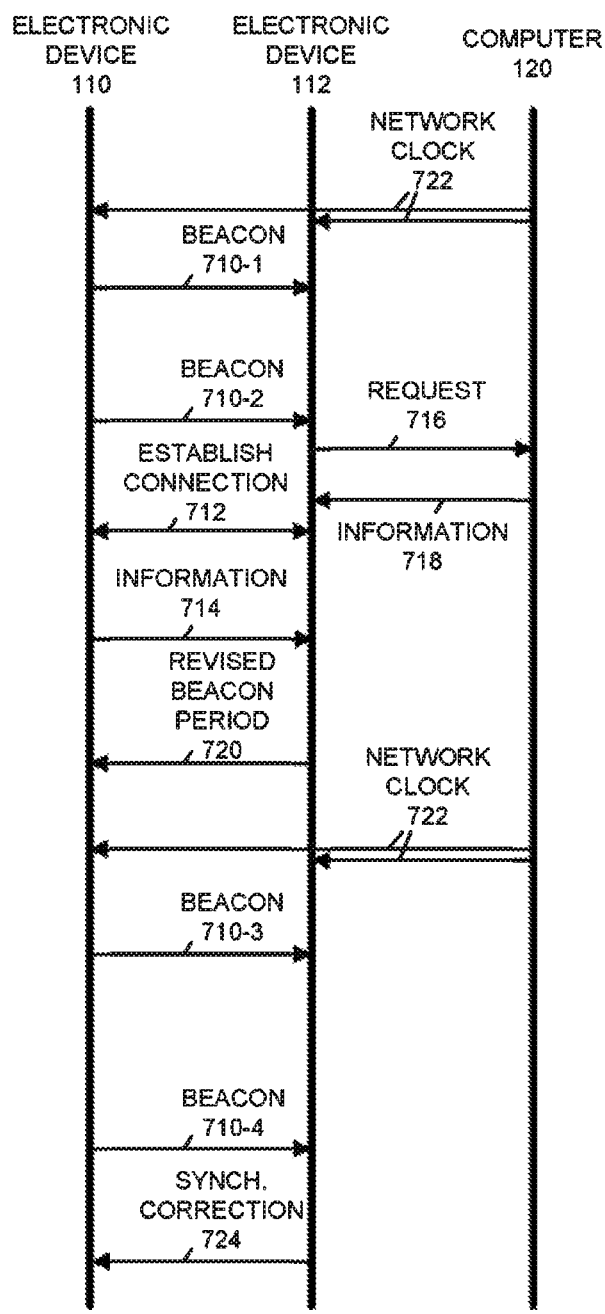
FIG. 7 is a drawing illustrating communication between the electronic devices of FIG. 1 in accordance with an embodiment of the present disclosure.

The detection technique is further illustrated in FIG. 7, which presents a drawing illustrating communication between electronic devices 110 and 112 (FIG. 1). In particular, electronic device 110 may transmit beacons 710 (where "beacons 710" is a generic term describing beacons such as beacons 710-1, 710-2, 710-3, and 710-4 as shown in FIG. 7) to electronic device 112 at transmit times having an initial beacon period. In turn, electronic device 112 may receive one or more of beacons 710 by opening scan windows having initial widths at an initial window period.

When a beacon (such as beacon 710-2) is received, a connection 712 between electronic devices 110 and 112 is optionally established. Then, electronic device 110 may optionally provide information 714 specifying a clock drift and/or the initial beacon period to electronic device 112. Alternatively or additionally, electronic device 112 may optionally determine the clock drift and/or the initial beacon period based on the transmit times. In some embodiments, electronic device 112 optionally accesses stored information in electronic device 112 and/or computer 120 that specifies the clock drift and/or the initial beacon period associated with electronic device 110. For example, electronic device 112 may request 716 the information and, in response, computer 120 may provide information 718.

After connection 712 is optionally established, electronic device 112 may also optionally provide a revised beacon period 720 to electronic device 110.

Moreover, electronic device 112 may calculate the transmit times of subsequent beacons from electronic device 110 based on the clock drift, the initial beacon period and/or the revised beacon period.

Subsequently, electronic device 110 may transmit beacons (such as beacons 710-3 and 710-4) to electronic device 112 at transmit times having the revised beacon period. In turn, electronic device 112 may receive one or more of beacons 710-3 and 710-4 by opening scan windows having revised widths at a revised window period. Because the revised beacon period is greater than the initial beacon period, the revised width is less than the initial width and/or the revised window period is greater than the initial window period, there may be significant power savings from electronic devices 110 and/or 112.

In some embodiments, computer 120 provides a network clock 722 to electronic devices 110 and/or 112. Electronic device 112 may use network clock 722 and the actual transmit times of subsequent beacons 710-3 and 710-4 provided by electronic device 110 to determine when the uncertainty or variation in the transmit times exceeds a threshold value. When this occurs, electronic device 112 may provide a synchronization correction 724 to electronic device 110, which allows electronic device 110 to keep the uncertainty bounded and, thus, which allows electronic devices 110 and 112 to continue to advertise and detect each other in a deterministic manner.

We now describe embodiments of the electronic device. FIG. 8 presents a block diagram illustrating an electronic device 800, such as one of electronic devices 110 and 112 in FIG. 1. This electronic device includes processing subsystem 810, memory subsystem 812, and networking subsystem 814. Processing subsystem 810 includes one or more devices configured to perform computational operations. For example, processing subsystem 810 can include one or more microprocessors, application-specific integrated circuits (ASICs), microcontrollers, programmable-logic devices, and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), and/or other types of memory. In some embodiments, instructions for processing subsystem 810 in memory subsystem 812 include: one or more program modules or sets of instructions (such as program module 822 or operating system 824), which may be executed by processing subsystem 810. Note that the one or more computer programs may constitute a computer-program mechanism. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, an interface circuit 818 and an antenna 820. For example, networking subsystem 814 can include a Bluetooth™ networking system, a cellular networking system (e.g., an 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices as described previously.

Within electronic device 800, processing subsystem 810, memory subsystem 812, and networking subsystem 814 are coupled together using bus 830. Bus 830 may include an electrical, optical, and/or electro-optical connection that the subsystems can use to communicate commands and data among one another. Although only one bus 830 is shown for clarity, different embodiments can include a different number or configuration of electrical, optical, and/or electro-optical connections between the subsystems.

In some embodiments, electronic device 800 includes a display subsystem 826 for displaying information on a display, which may include a display driver and the display, such as a liquid-crystal display, a multi-touch touchscreen, etc. In addition, electronic device 800 may include clock circuit 828 that outputs a clock. Note that clock circuit 828 may be included in a GPS circuit.

Electronic device 800 can be (or can be included in) any electronic device with at least one network interface. For example, electronic device 800 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, a sensor, a user-interface device and/or another electronic device.

Although specific components are used to describe electronic device 800, in alternative embodiments, different components and/or subsystems may be present in electronic device 800. For example, electronic device 800 may include one or more additional processing subsystems 810, memory subsystems 812, networking subsystems 814, and/or display subsystems 826. Additionally, one or more of the subsystems may not be present in electronic device 800. Moreover, in some embodiments, electronic device 800 may include one or more additional subsystems that are not shown in FIG. 8. For example, electronic device 800 can include, but is not limited to, a data collection subsystem, an audio and/or video subsystem, an alarm subsystem, a media processing subsystem, and/or an input/output (I/O) subsystem. Also, although separate subsystems are shown in FIG. 8, in some embodiments, some or all of a given subsystem or component can be integrated into one or more of the other subsystems or component(s) in electronic device 800. For example, in some embodiments program module 822 is included in operating system 824.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values Additionally, components and circuits may be single-ended or differential, and power supplies may be unipolar or bipolar.

An integrated circuit may implement some or all of the functionality of networking subsystem 814, such as a radio. Moreover, the integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with the Bluetooth™ standard was used as an illustrative example, the described embodiments of the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the detection technique may be implemented using program module 822, operating system 824 (such as a driver for interface circuit 818) or in firmware in interface circuit 818. Alternatively or additionally, at least some of the operations in the detection technique may be implemented in a physical layer, such as hardware in interface circuit 818.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   a memory; and
   one or more processors coupled to the memory, wherein the one or more processors are configured to:
      receive, during a first scan window from a second electronic device, a first beacon associated with an initial beacon period;
      select a revised beacon period that is longer than the initial beacon period;
      determine a clock drift associated with the second electronic device;
      transmit the revised beacon period to the second electronic device, wherein the revised beacon period is to be used for one or more subsequent beacons; and
      open a second scan window based on the revised beacon period and the clock drift.

2. The electronic device of claim 1, wherein the one or more processors are further configured to calculate a transmit time of a subsequent beacon based at least on the revised beacon period.

3. The electronic device of claim 2, wherein the one or more processors are further configured to open the second scan window in order to receive the subsequent beacon at the calculated transmit time.

4. The electronic device of claim 1, wherein the first scan window has an initial window width and the second scan window has a second window width that is less than the initial window width.

5. The electronic device of claim 4, wherein the first scan window is associated with an initial window period, and the second scan window is associated with a second window period that is greater than the initial window period.

6. The electronic device of claim 4, wherein for a subsequent time occurring after a synchronization time, the one or more processors are configured to receive a third beacon by opening a third scan window having the initial window width.

7. The electronic device of claim 1, wherein for a time subsequent to the second scan window, a width of a third scan window can increase as a function of time and the increase in the width of the third scan window can be based at least in part on the clock drift.

8. The electronic device of claim 1, wherein the electronic device consumes less power to receive a subsequent beacon during the second scan window compared to receiving the first beacon during the first scan window.

9. The electronic device of claim 1, wherein the one or more processors are further configured to:
   receive a network clock;
   calculate a transmit time based at least on the network clock;
   determine that a difference between an actual transmit time associated with a beacon and the calculated transmit time exceeds a threshold value; and
   transmit, based at least on the determination, a synchronization correction to the second electronic device.

10. A method, comprising:
    receiving, at a first electronic device, a first beacon during a first scan window;
    accessing stored information specifying an initial beacon period associated with the first beacon;
    selecting a revised beacon period based at least on the initial beacon period;
    transmitting the revised beacon period to a second electronic device, wherein the revised beacon period is longer than the initial beacon period; and
    opening a second scan window based on the revised beacon period.

11. The method of claim 10, further comprising calculating a transmit time of a subsequent beacon based at least on the revised beacon period and a clock drift associated with the second device.

12. The method of claim 11, wherein the opening the second scan window comprises receiving the subsequent beacon substantially at the calculated transmit time.

13. The method of claim 10, wherein the first scan window has an initial window width, and the second scan window has a second window width that is less than the initial window width.

14. The method of claim 13, wherein the first scan window is associated with an initial window period, and the second scan window is associated with a second window period that is greater than the initial window period.

15. The method of claim 14, wherein for a subsequent time occurring more than a threshold duration after a synchronization time, the method comprises receiving a third beacon by opening a third scan window having the initial window width.

16. The method of claim 11, wherein for a time subsequent to the second scan window, a width of a third scan window can increase as a function of time and the increase in the width of the third scan window can be based at least in part on the clock drift.

17. The method of claim 10, wherein the first electronic device consumes less power receiving a subsequent beacon during the second scan window compared to receiving the first beacon during the first scan window.

18. The method of claim 10, further comprising:
receiving a network clock;
calculating a transmit time based at least on the network clock;
determining that a difference between an actual transmit time associated with a beacon and the calculated transmit time exceeds a threshold value; and
transmitting, based at least on the determination, a synchronization correction to the second electronic device.

19. A non-transitory computer-readable medium storing instructions that, when executed by a processor of a first electronic device, cause the processor to perform operations comprising:
receiving during a first scan window, a first beacon associated with an initial beacon period;
selecting a revised beacon period that is longer than the initial beacon period;
transmitting the revised beacon period to a second electronic device to be used for a subsequent beacon; and
receiving the subsequent beacon during a second scan window based at least on the revised beacon period, wherein using the revised beacon period allows the first electronic device to consume less power than using the initial beacon period.

20. The non-transitory computer-readable medium of claim 19, wherein the operations further comprise calculating a transmit time of the subsequent beacon based at least on the revised beacon period and a clock drift associated with the second electronic device.

\* \* \* \* \*